Patented June 18, 1935

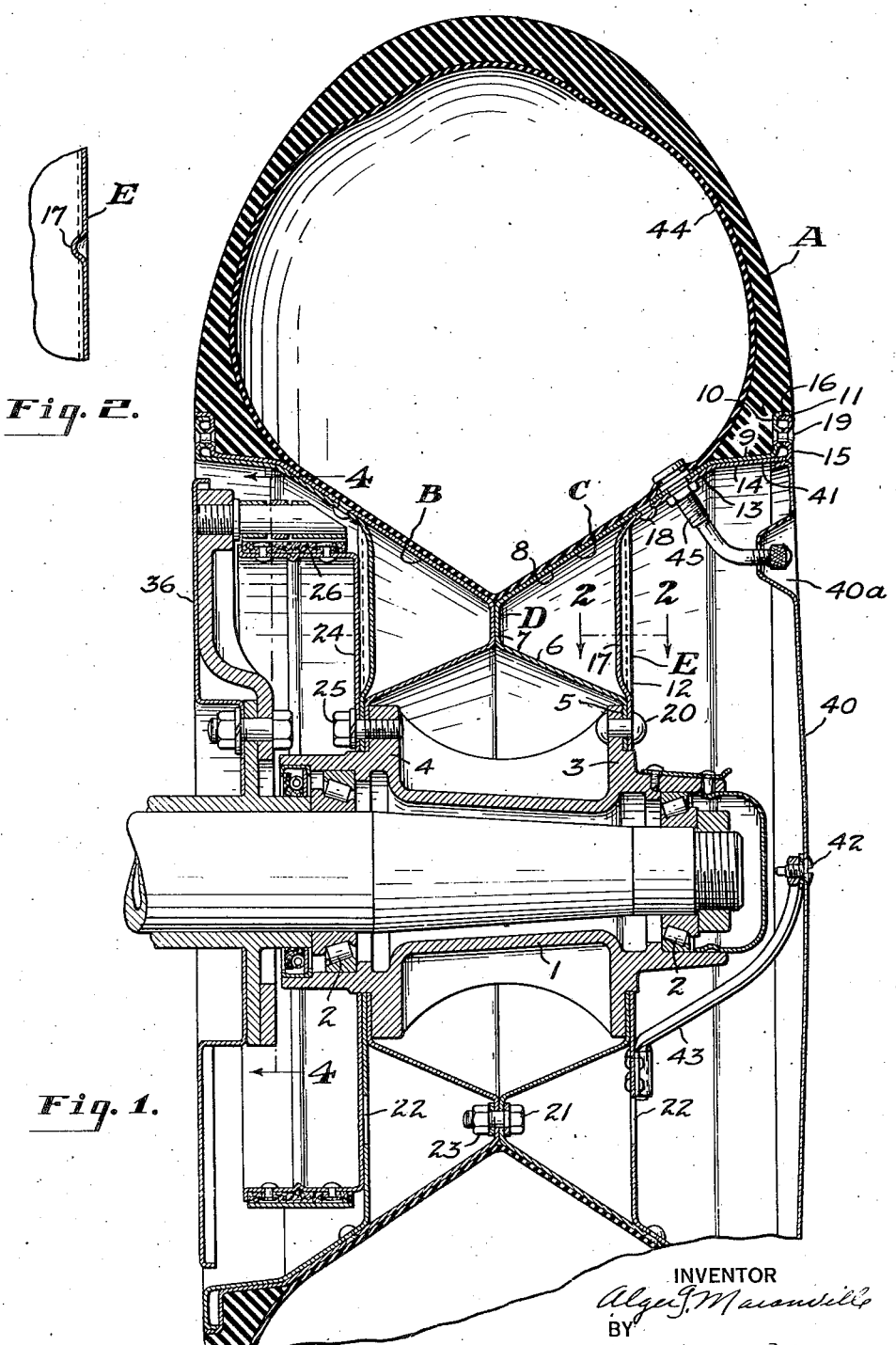

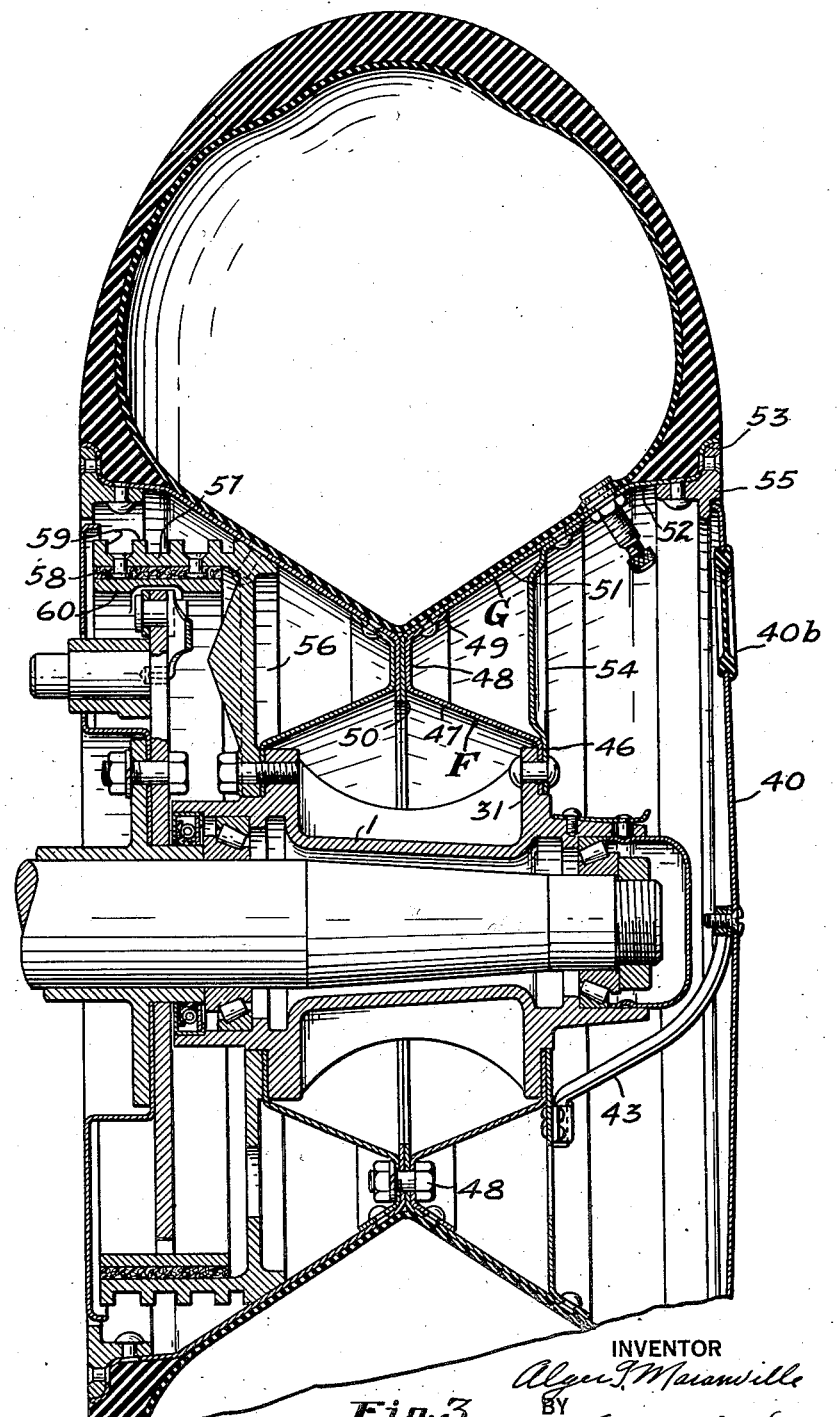

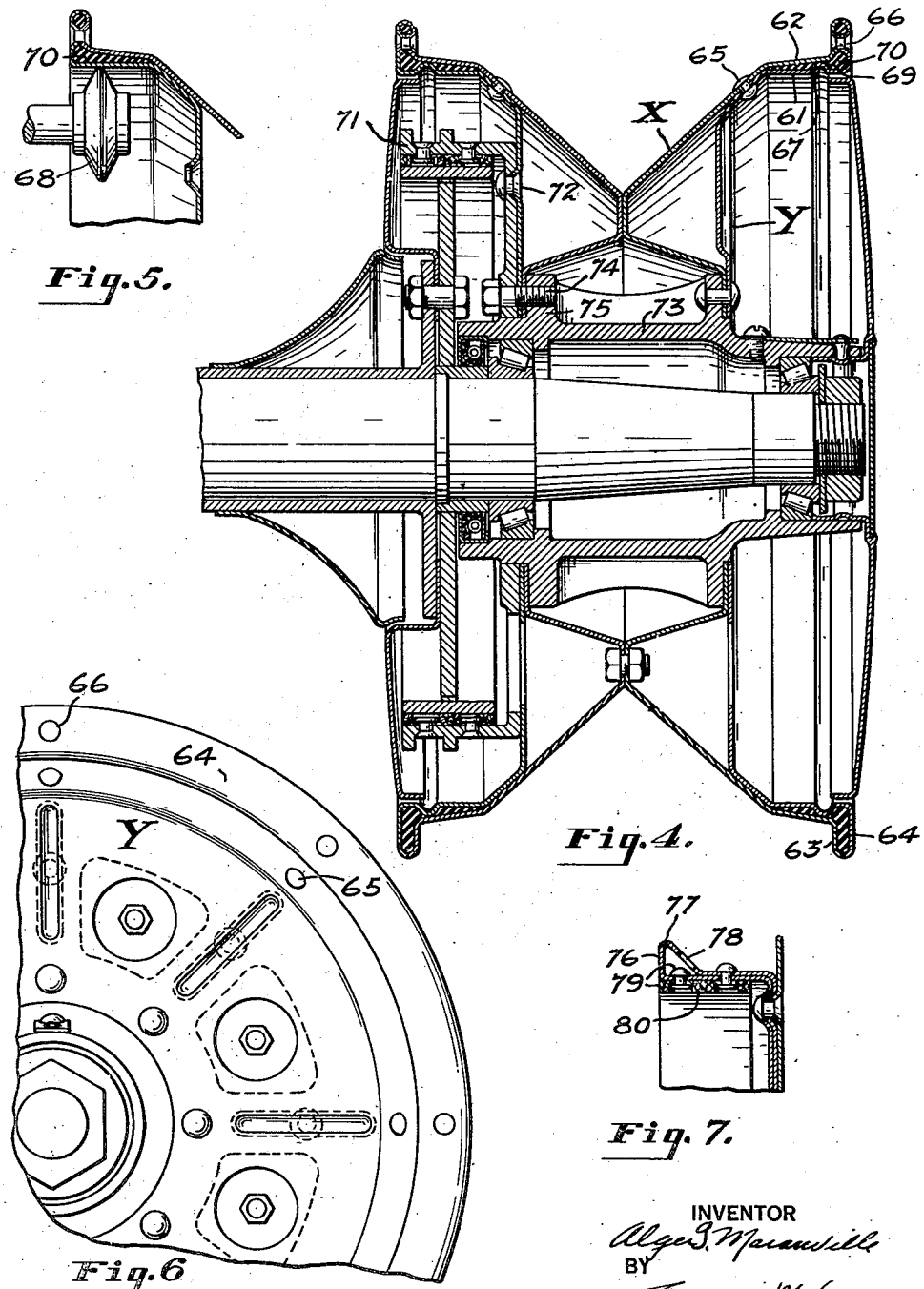

2,005,628

UNITED STATES PATENT OFFICE 2,005,628

VEHICLE WHEEL

Alger G. Maranville, Akron, Ohio, assignor to The General Tire & Rubber Company, Akron, Ohio, a corporation of Ohio Application February 11, 1932, Serial No. 592,317

9 Claims. (Cl. 301—63)

This invention relates to vehicle wheel and rim constructions and more particularly to such constructions that are suitable for use with wide base, relatively small bead diameter pneumatic tires.

One of the objects of the present invention is to provide a wheel and rim construction for pneumatic tires which is of simple but extremely rigid construction.

Another object is to provide a wheel and rim construction for relatively small bead diameter vehicle tires which, with the exception of a hub, may be easily and economically constructed of sheet material.

A further object is to provide a rigidly reinforced wheel and rim construction for vehicle tires having a relatively wide base in which the load is distributed to the hub of the wheel at a plurality of spaced planes.

Another object is to provide a wheel and rim construction of the character mentioned, in which a brake mechanism may be compactly arranged within the axial limits of the tire width.

With the above and other objects in view which will be apparent from the following detailed description, the present invention consists in certain features of construction and combinations of parts which will be readily apparent to those skilled in the art to which the invention appertains.

In the drawings which illustrate suitable embodiments of the invention,

Figure 1 is a transverse section taken through a wheel and rim assembly and showing a pneumatic tire having a relatively wide base and relatively small bead diameter, mounted thereon;

Fig. 2 is a section taken substantially on the line 2—2 of Fig. 1 showing one of the radial ribs formed in the reinforcing plate;

Fig. 3 is a section through a wheel and rim assembly similar to Fig. 1 but showing a modified reinforcing means for the wheel and showing an internal brake mechanism for the modified portion of the wheel;

Fig. 4 is a transverse section of a further modified wheel and rim construction embodying slight changes in the rim portion of the assembly;

Fig. 5 is a section showing the manner of forming a reinforcing bead in the rim portion;

Fig. 6 is a side elevation of the structure shown in Fig. 4, the cover or hub plate being removed; and Fig. 7 is a section taken through a brake drum of a modified type which may be incorporated in the construction of Fig. 4.

Referring to the accompanying drawings in which like numerals refer to like parts, and in particular to Figs. 1 and 2, one form of the present invention is shown that is suitable for a pneumatic tire A having a relatively wide base,—that is, a relatively wide bead spacing and a relatively small bead diameter. In the construction shown in these views, the wheel assembly is mounted upon a cast hub portion 1 having its ends counterbored to receive suitable bearings 2. The hub portion 1 is provided at each end with outer and inner radial flanges 3 and 4, respectively, which distribute the load at spaced points to the wheel structure.

The wheel and rim structure, as previously mentioned, is formed of sheet metal such as a suitable aluminum alloy, that is light in weight and rigidly reinforced. This structure comprises inner and outer half portions B and C, respectively, which are secured to the inner and outer flanges 4 and 3, respectively, and which are secured together along a median plane. Each half portion comprises a main body portion D and a reinforcing portion E.

The main body portion D is preferably spun, although it may be stamped, from sheet metal to form an annular plate having an inner radial flange 5 positioned to be mounted on a radial flange of the hub portion, a frusto-conical portion 6 having its base positioned at the parting line of the two half portions and a radial flange 7 extending outwardly from the base portion for engagement with the corresponding flange of the other half portion. Each main body portion D is further formed with a conical wall 8 diverging with respect to the frusto-conical portion 6 and terminating in a bead supporting flange 9 arranged at a lesser angle than the portion 8. The bead supporting flange 9 is formed at its marginal periphery with a radial flange 10 that is engageable with the side face of the bead and with a relatively narrow circumferential flange 11 extending transversely of and at the marginal edge of the flange 10, as shown in Fig. 1, for engagement with a portion of the tire side wall material.

Each reinforcing portion E is preferably spun or stamped from light weight sheet material which embodies a radial portion 12 having its radially inner portion engageable with the flange 5 of the body portion D. This reinforcing portion E extends and bridges the space between the frusto-conical portions 6 and conical portion 8 of the main body portion and is formed with a portion 13 inclined to the same angle as the conical portion 8 previously described and with an outer flange portion 14 engageable with the bead supporting flange 9 of the main body portion D. This portion 14 terminates in a radial flange 15 spaced from the flange 10 of the body portion and having at its periphery a relatively narrow inwardly extending flange 16 nested within the narrow flange 11 of the main body portion and having its radial face substantially seating against the radial flange 10 of the body portion. The radial portion 12 of the reinforcing portions E are further preferably formed with radial ribs 17 to provide additional reinforcements. These ribs may be formed during the stamping operation when these portions are stamped from sheet metal, or they may be formed during the blanking operation prior to opening when these members are spun from sheet metal. The members E and C are rigidly secured together by means of rivets 18 extending through apertures formed in the conical portions 8 of the main body portions D and the conical portions 13 of the reinforcing portion E which engage each other and are further secured together by means of rivets 19 that extend through apertures formed in the spaced radial flanges 10 and 15 of the portions C and E, respectively, these latter apertures being so formed that the surrounding metal forms abutting flanges to prevent the collapse of these radial flanges during the riveting operation. In assembling the axial structure to the hub portion 1 the wheel half C is first secured to the radial flange 3 of the hub portion 1 by means of regularly spaced rivets 20 which extend through the radial flange 5 and the radial portion 12 of the members C and E, respectively. The wheel half B is then positioned on the hub adjacent the flange 4 and is bolted to the wheel half C by means of suitable bolts 21 extending through apertures formed in the abutting radial portions 7 of the main body portions C of the wheel halves, suitable apertures or windows 22 being formed in the radial portions of the reinforcing elements E to permit the insertion of the bolts 21 and the nuts 23 which are threaded on the bolts 21.

It will be noted in Fig. 1 that a relatively wide space is provided within the bead portions of the vehicle tire which is sufficient to receive a suitable brake mechanism that may be confined therein within the axial limits of the tire supporting portion of the assembly. In the construction shown in Fig. 1, a suitable external brake mechanism is employed comprising a drum 24, the radial portion of which is abutted against the radial portion 12 of the reinforcing element E that is secured to the main body portion B, and is secured together with the radial portion 12 to the hub flange 4 by means of suitable cap screws 25. In this construction the friction material 26 is secured directly to the brake drum 24 which will prevent the transfer of heat to the wheel structure.

The opposite side of the wheel structure is also closed in by means of a closure plate 40 which is formed with a circumferential flange 41 that is arranged to nest within the flange 14 of the outer reinforcing element E. This closure plate is held in position by a central screw 42 which is threaded into a bracket arm 43 pivotally secured to the outer reinforcing element E, as shown in Fig. 1.

As shown in Fig. 1, the air capacity of the vehicle tire A is greatly increased and given a greater displacement by means of the conical portions 8 of the main body portions B and C which diverge from the points of attachment of the body portions B and C outwardly toward the bead supporting portions 9 of the body portions B and C.

It is desirable to use an inner tube 44 of sufficient size to engage, when inflated, with the inner walls of the tire casing A and with the diverging conical portions 8 of the main body portions B and C, the tube being provided with an air valve 45 which extends outwardly through apertures formed in the abutting portions 8 and 13 of the outer elements C and E.

The inwardly sloping bead supporting flanges 9 of the body portions B and C assist in holding the tire beads in position, and by means of the air pressure within the tube 44 are forced securely against the radial flanges 10 of the body portions B and C.

It is to be particularly noted in the construction shown that the open spaces within the portions that may be said to comprise the tire rim are completely enclosed, which, together with the shape of the vehicle tire, has a tendency to stream-line the tire and thereby decrease air resistance.

In the construction shown in Fig. 3, the main body portion of each wheel half is formed of two elements comprising a radially inward element F and a radially outward element G. The element F is formed of stamped sheet metal and comprises a radial flange 46 disposed to be secured to the flange of the hub portion 1, a frusto-conical portion 47 extending inwardly to the center line of the structure and having an outer radial flange 48 which terminates in a marginal inclined flange 49. The radially outward element G comprises a radially inwardly extending flange 50 positioned to abut the corresponding flange of the other element and seat against the radial flange 48 of the element F, and an inclined portion 51 that extends outwardly to circumscribe the element F and terminating in a bead supporting flange 52 arranged at a lesser angle than the portion 51. This bead supporting flange 52 is formed with a marginal radial flange 53 which is arranged to engage the radial face of the vehicle tire. This construction is also provided with a reinforcing element 54 which bridges the space between the elements F and G, and being secured at its outer periphery to the inclined portion 51 of the element G and being secured at its inner periphery together with the flange 46 directly to the radial flange 3 of the hub portion 1. Furthermore, the marginal flange 49 of the element F is riveted directly to the inclined portion 51 of the element G. It is to be noted in this construction that the reinforcing element 54 does not, as in the construction previously described, underlie the bead supporting portion of the element G and in order to compensate for this and strengthen the bead supporting portion, a suitable cast ring element 55 is secured in nesting relation to the inner surfaces of the bead supporting flanges 52 and 53.

The reinforcing element 54 of sheet metal is omitted from the inner wheel half and replaced in the Fig. 3 construction by a cast element 56 bolted together with the flange 46 to the inner radial flange of the hub portion and riveted directly to the inclined portion 51 of the element G of the inner wheel half, this reinforcing element 56 being formed with a drum portion 57 within which suitable internal brake shoes 60 are confined, the friction material 58 being secured directly to the inner face of the drum 57.

The drum 57 may, if desired, be formed with a plurality of spaced cooling fins 59 extending circumferentially around its external face.

In the construction shown in Figs. 4 to 7, inclusive, the main body elements X and the radial reinforcing elements Y are formed to approximately the same shape as the corresponding portions of the structure shown in Fig. 1, with the exception that the tire bead supporting portions are of slightly different construction. The transversely extending flange portion 61 of each reinforcing element Y that is circumscribed by the bead supporting flange 62 of the main body element X is initially shaped to lie within the flange 62 in circumferentially spaced relation, as shown in Fig. 5. The radial flanges 63 and 64 at the marginal edges of the flanges 61 and 62, respectively, are shaped to circumferentially abut each other at their extreme peripheral edges which are curved inwardly toward each other, thereby providing a space between the flanges 63 and 64 and a space between the flanges 61 and 62. The main body element X and the reinforcing element Y of each wheel half are rigidly secured together by rivets 65 at the conical portions adjacent the flanges 61 and 62 and are further secured together at regular spaced intervals by suitable rivets 66 extending through the flanges 63 and 64, the metal of the flanges 63 and 64 defining the rivet openings being in engagement.

Prior to the time the elements X and Y are secured together, a body of suitable rubber material is disposed within the space defined by the flanges 61 and 62 and the flanges 63 and 64, as shown in Fig. 5. After the elements X and Y are secured together a continuous depression 67 is formed by some means such as a roller 68, as shown in Fig. 5, around the inner periphery of the flange 61 to form a rib 69 of appreciable arear extending into substantial engagement with the bead supporting flange 62. The formation of this rib 69 in the flange 61 places the rubber material 70 under severe compression stresses so that the same while not materially increasing the weight of the rim portion of the wheel assembly materially strengthens those portions of the wheel assembly upon which the vehicle tire beads are mounted.

In the Fig. 4 construction a cast brake drum 71 is shown for use with an internal brake mechanism. The drum 71 is formed with a radial portion which is secured by means of rivets 72 to the radial reinforcing element Y and is also secured to the wheel hub portion 73 by means of the cap screw 74 which bolt the elements X and Y of the inner wheel half to the wheel hub flange 75.

As shown in Fig. 7, the cast brake drum 71 may be replaced by a stamped metal drum 76 formed of a double thickness of sheet metal, the metal at the marginal edge of the drum being so formed as to provide a circumferential reinforcing rib 77. This rib 77 is formed by flanging the sheet metal radially outwardly and then inwardly at an angle into contact with the inner thickness of the drum, the inclined portion of the rib 77 being formed with suitable apertures 78 for the insertion of rivets 79 which secure suitable brake friction material 80 to the brake drum 76. The brake drum 76 may be secured to the inner reinforcing element X in the same manner as the cast drum 71.

It will be noted that each of the wheel constructions shown in Figs. 1, 3, and 4 embodies a pair of wheel halves, each wheel half including a main body portion rigidly secured to the corresponding portion of the other and also being rigidly secured to one of the wheel hub flanges. It will be further noted that the main body portions diverge away from each other from their points of attachment, and each terminates in a tire bead supporting portion. These main body portions also diverge inwardly from their point of attachment and terminate in radial flanges which are secured to the hub portion. Each wheel half also includes a reinforcing element rigidly secured to the wheel hub flanges and rigidly secured to the diverging portions of the main body portions in order that the load may be transmitted at a pair of spaced points to the wheel hub. In the case of the construction shown in Figs. 1 and 4, the reinforcing elements are circumscribed and in substantial engagement with the bead supporting portions of the main body elements in order to strengthen the same. However, in the construction shown in Fig. 9 the bead supporting portion of each main body portion is strengthened by means of a cast ring of suitable design.

As shown in Fig. 1, the closure plate 40 is formed with a cup-like depression 40ª for the reception of the valve stem 45 in order that easy access may be had to the stem 45. In Fig. 3 the valve steam is relatively short and access is provided to the same through a window cut in the closure plate 40 which is normally closed by a rubber door 40ᵇ that may be easily removed. It is obvious, however, that other means for accomplishing the same purpose may be employed.

In each of the constructions described, a brake mechanism is provided to lie within the limits of axial width of the portion forming the rim of the wheel assembly and is confined at one side of the assembly within the space defined by the reinforcing element and the bead supporting portions of the assembly at that side of the assembly. Another feature to be noted in each of the constructions shown is that the space lying within the bead supporting portions of the assembly are substantially completely closed in by means of cover plates nesting within the bead supporting portions.

The wheel and rim structure of the present invention may be advantageously used with a pneumatic tire of the type disclosed and claimed in my Patent No. 1,969,088, granted Aug. 7, 1934, and in the construction of a streamlined wheel and tire assembly such as disclosed and claimed in my co-pending application Serial No. 686,743, filed August 25, 1933.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a wheel and rim structure for pneumatic tires, a hub element, sheet metal main body members secured to said hub element, said members each having a generally axial tire bead engaging portion terminating in a radial bead engaging flange, an annular member secured to each said main body member and having a generally axial portion spaced from said first axial portion and terminating in a radial flange spaced from the first mentioned flange, said flanges being in continuous engagement with each other at their peripheries and means for securing said flanges together.

2. In a wheel and rim structure for pneumatic tires, a hub element, sheet metal main body members secured to said hub element, said members each having a generally axial tire bead engaging portion terminating in a radial bead engaging flange, an annular member secured to each said main body member and having a generally axial portion spaced from said first axial portion and terminating in a radial flange spaced from the first mentioned flange, said flanges being in continuous engagement with each other at their peripheries, means for securing said flanges together, and a body of resilient material firmly compressed within the space defined by said flanges and axial portions.

3. In a wheel and rim structure for pneumatic tires, a hub element, sheet metal main body members secured to said hub element, said members each having a generally axial tire bead engaging portion terminating in a radial bead engaging flange, an annular member secured to each said main body member and having a generally axial portion spaced from said first axial portion and terminating in a radial flange spaced from the first mentioned flange, said flanges being in continuous engagement with each other at their peripheries, means for securing said flanges together, and a body of resilient material confined within the space defined by said flanges and axial portions, said last mentioned axial portion being depressed circumferentially to place said resilient material under substantial compression.

4. In a wheel and rim structure for pneumatic tires, a hub element, sheet metal main body members secured to said hub element, said members each having a generally axial tire bead engaging portion terminating in a radial bead engaging flange, an annular member secured to each said main body member and to said hub element and having a generally axial portion spaced from said first axial portion and terminating in a radial flange spaced from the first mentioned flange, said flanges being in continuous engagement with each other at their peripheries, and means for securing said flanges together.

5. A combined wheel and rim structure for pneumatic tires for aircraft use comprising a hub having axially spaced radial flanges, and a wheel and rim body including a pair of annular stamped metal wheel halves, each half having a radial portion intermediate the inner and outer peripheries thereof abutting and being secured to the corresponding radial portion of the other wheel half, a radially inner portion of frusto-conical shape having a radially inwardly extending flange secured to one of said radial flanges of said hub, and a radially outer portion of frusto-conical shape diverging laterally and radially outwardly away from the corresponding portion of the other wheel half and from said radially inner frusto-conical portion and terminating in a tire engaging bead flange, said radial outer frusto-conical portion being of substantially greater axial width of the said inner frusto-conical portion, and the axial distance between the bead flanges of said radially outward portions being materially greater than the axial distance between said flanges of said hub, each of said wheel halves also having an annular element bridging the space between said radially inner and outer frusto-conical portions and being secured to the radially inner frusto-conical portion adjacent the inner edge thereof and to said radially outer frusto-conical portion intermediate the radial portion and radial bead flange thereof.

6. A combined wheel and rim structure for pneumatic tires for aircraft use comprising a hub having axially spaced radial flanges, and a wheel and rim body including a pair of annular stamped metal wheel halves, each half having a radial portion intermediate the inner and outer peripheries thereof abutting and being secured to the corresponding radial portion of the other wheel half, a radially inner portion of frusto-conical shape secured at its radially inner edge to one of said radial flanges of said hub, and a radially outer portion of frusto-conical shape diverging laterally and radially outwardly away from the corresponding portion of the other wheel half and from said radially inner frusto-conical portion and terminating in a tire engaging bead flange, said radial outer frusto-conical portion being of substantially greater axial width than the axial width of the said inner frusto-conical portion, and the axial distance between the bead flanges of said radially outward portions being materially greater than the axial distance between said flanges of said hub, each of said wheel halves also having an annular element secured to the radially inner frusto-conical portion adjacent the wheel hub flange and having a flange at its outer periphery abutting and secured to the radially outer frusto-conical portion at a region intermediate the radial portion and bead flange of the said wheel half.

7. A combined wheel and rim structure for pneumatic tires for aircraft use, comprising a hub having axially spaced radial flanges, and a wheel and rim body comprising a pair of mating annular wheel halves having radial portions abutting each other in a plane substantially midway between the planes of said hub flanges, radially inner frusto-conical portions at the radially inner edges of said radial portions diverging away from each other at a substantial obtuse angle and being rigidly secured at their inner peripheral edges to said hub flanges, radially outer frusto-conical portions at the radially outer edges of said radial portions diverging away from each other at a substantial obtuse angle and from the inner frusto-conical portions and terminating in radial bead flanges well beyond the radially inner edges of said inner frusto-conical portions, and annular reinforcing elements, each having its opposite peripheral edges engaging and secured to the inner and outer frusto-conical portions of a wheel half, the region of attachment of each element with the outer frusto-conical portion being intermediate the radial portion and bead flange of such frusto-conical portion.

8. A combined wheel and rim structure for pneumatic tires for aircraft use, comprising a hub having axially spaced radial flanges, and a wheel and rim body comprising a pair of mating annular wheel halves having radial portions abutting each other in a plane substantially midway between the planes of said hub flanges, radially inner frusto-conical portions at the radially inner edges of said radial portions diverging away from each other at a substantial obtuse angle and terminating in radial, inwardly extending flanges secured to said hub flanges, radially outer frusto-conical portions at the radially outer edges of said radial portions diverging away from each other at a substantial obtuse angle and from the inner frusto-conical portions and terminating in radial bead flanges well beyond the radially inwardly extending flanges of said inner frusto-conical portions, and annular reinforcing elements, each having its opposite peripheral edges engaging and secured to the inner and outer frusto-conical portions of a wheel half, the region of attachment of each element with the outer frusto-conical portion being intermediate the radial portion and bead flange of such frusto-conical portion, said elements having radially inner radial portions abutting the radial inwardly extending flanges of said inner frusto-conical portions.

9. A combined wheel and rim structure for pneumatic tires for aircraft use, comprising a hub having axially spaced radial flanges, and a wheel and rim body comprising a pair of mating annular wheel halves having radial portions abutting each other in a plane substantially midway between the planes of said hub flanges, radially inner frusto-conical portions at the radially inner edges of said radial portions diverging away from each other at a substantial obtuse angle and being rigidly secured at their inner peripheral edges to said hub flanges, radially outer frusto-conical portions at the radially outer edges of said radial portions diverging away from each other at a substantial obtuse angle and from the inner frusto-conical portions and terminating in radial bead flanges well beyond the radially inner edges of said inner frusto-conical portions, and annular reinforcing elements, each having its opposite peripheral edges engaging and secured to the inner and outer frusto-conical portions of a wheel half, the region of attachment of each element with the outer frusto-conical portion being intermediate the radial portion and bead flange of such frusto-conical portion, the angle of inclination of the outer frusto-conical portion of one wheel half intersecting the angle of inclination of the inner frusto-conical portion of the other wheel half substantially adjacent the hub flange to which the last mentioned wheel half is secured.

ALGER G. MARANVILLE.